Figure 1:
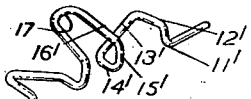

Aug. 20, 1957  V. G. K. WALTERS  2,803,020
UPHOLSTERY SPRING ASSEMBLIES
Filed April 19, 1954

Inventor
VERNON GEORGE KING WALTERS
By
Holcombe, Witherill & Brisebois
Attorneys United States Patent Office 2,803,020
Patented Aug. 20, 1957

2,803,020

UPHOLSTERY SPRING ASSEMBLIES

Vernon G. K. Walters, Northallerton, England

Application April 19, 1954, Serial No. 424,170

6 Claims. (Cl. 5—273)

Spring assemblies, comprising a number of rows of upholstery springs, the springs of one row being substantially aligned with the springs of an adjacent row, and connected together at their upper and lower ends to form a unit, are used for various purposes, for example, as the resilient filling for cushions, chair and settee seats and backs, and in mattresses. A number of different methods of connecting the springs together are used.

One of the most common methods for connecting together the upper and lower end convolutions of the springs in two adjacent rows of springs, is by means of a helical wire threaded on to the said convolutions, so that spaced turns of the helical wire encircle and tie together the said convolutions of the several aligned pairs of springs in the two rows. This method is convenient, but suffers from the disadvantage that during assembly, it is possible to cause incorrect spacing of the springs in the direction of the length of the rows if care is not taken to ensure that appropriately spaced turns of the helical wire are engaged with the springs. Furthermore, owing to the helical formation of the said wire, it is capable of lengthwise elongation and contraction, so that the springs will not be held at their correct spacing apart when stress is applied, as in conditions of use. The helical wires may even become permanently distorted, for example elongated, which will then cause undesirable variations in the spacing of the springs.

The present invention is designed to provide means for connecting together the springs in adjacent rows of a spring assembly, in which the said disadvantages will be avoided.

According to the invention, a tie wire, for connecting together the upper or lower end convolutions of the aligned springs of two adjacent rows of springs, has a series of lateral loops formed therein at spaced apart intervals along its length, each loop being formed into a double helix for encircling engagement with the said convolutions of a spring in each row. By double helix is meant that each side of the loop is of helical formation the two sides being oppositely directed. The centre of the loop which connects together the two helical formations serves as a lead when engaging the tire wire with the springs, and can be passed over or under the abutting or overlapping portions of two spring convolutions to be connected together, whereupon rotation of the tie wire about the axis of the helical formations will cause the latter to completely encircle the said portions of the spring convolutions. The centre or lead of each loop formation is preferably extended tangentially of the helical formations to facilitate engagement with the springs.

Preferably, the helical formations will be somewhat deformed instead of following a truly helical path. This deformation may be either in an axial direction or circumferential, or both axial and circumferential. The deformations may be designed to more closely tie together the convolutions of the springs, bearing in mind that the portions of the two convolutions to be tied together are oppositely facing arcs, but should not be so tight as to unduly restrict pivoting of the two convolutions relatively to one another about their connection together. The deformations may, however, be such as to co-operate with the said convolutions whereby rotation of the tie wire about the axis of the helical formations will be resisted sufficiently to avoid unintentional rotation of the tie wire.

Figure 2:
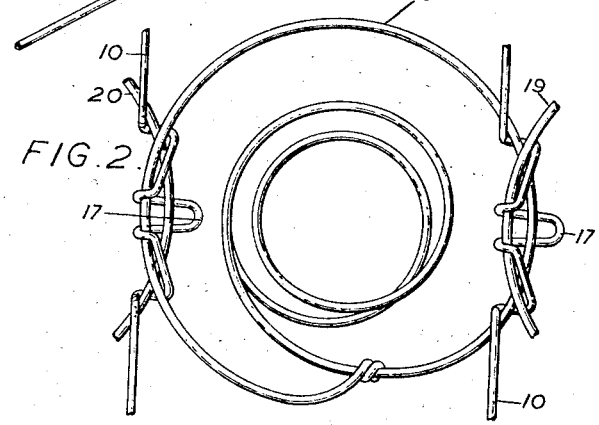
Figure 4:
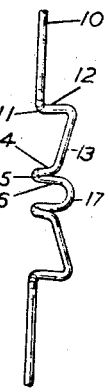
Figure 3:
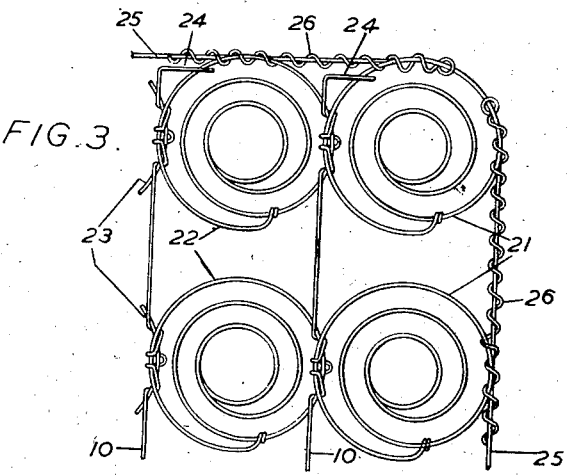

In order that the invention may be clearly understood and readily carried into effect, a preferred construction of the tire wire with double helical formations, together with a modification, will now be more fully described, by way of example only, with reference to the accompanying drawings, in which:

Figure 1 is a perspective view of a portion of the tie wire showing two of the double helical formations, Figure 2 is a plan view showing tie wires engaging with the end convolutions of upholstery springs, Figure 3 is a plan view in part of a spring asesmbly incorporating the tie wires, and Figure 4 is a plan view of part of a tie wire showing a modification of the double helical formation.

Referring to the drawings, the tie wire 10 has several double helical formations spaced apart along the length of the tie wire, which comprises straight sections between the said formations, and the axis of the straight sections will be referred to as the main axis of the wire. Assuming the tie wire is disposed with its main axis horizontal, the deformed helix commences from a straight section by a vertical upward bend 11, this bend being approximately one quarter of a circle. The wire then is bent horizontally rearwards, as at 12, with a relatively sharp bend, at right angles to the main axis. Then the wire is bent longitudinally and downwardly, as shown at 13, at an angle to the main axis but in a plane parallel to the main axis and down to the level thereof. From here the wire is bent horizontally forwards, as at 14, towards the main axis continuing in a semi-circle 15 upwards about the axis of the helix which is parallel with the main axis. This completes one half of the double helix through one and a half turns, but the wire is continued horizontally rearwards, as at 16, to the central portion of the loop which serves as the lead and comprises a semi-circle 17 extending lengthwise of the wire about a vertical axis. The wire continues horizontally forwards, as at 16' into the other half of the double helix which is exactly the reverse of the first half and finally leads into the next straight section of the tie wire. The semi-circle 17 of the lead together with the two adjoining horizontal portions 16, 16' form a tongue projecting to one side of the axis of the helix for convenient engagement with the springs in assembling them. The several parts of the second half of each double helix and numbered, 11', 12', 13', 14', 15', and 16' correspond with the parts 11, 12, 13, 14, 15 and 16 respectively of the first half, and both halves lie on the same side of the vertical plane passing through the tie wire, as shown in Figs. 1, 2 and 3.

A tie wire comprising offset helical portions constructed as described above, can be engaged with the upper or lower end convolutions of two rows of springs as shown in Figures 2 and 3, and in the following manner.

In Figure 2, one upholstery spring 18 is shown, and portions of the end convolutions 19 and 20 of aligned springs in adjacent rows at each side of the row of springs in which the spring 18 is disposed, are shown connected with the end convolution of the spring 18 by the double helical formations of two tie wires 10. In Figure 3 the end convolutions of one row of springs 21 are connected by a tie wire 10 to the end convolutions of a second row of springs 22 and the latter are connected by another tie wire 10 to the end convolutions of a third row of springs 23, only part of the latter springs being shown, the number of springs in each row and the number of rows depending on the size and shape of the spring assembly to be made.

The tie wire can be engaged with the springs by having the row 21 standing on a support or bench, whereupon, the lead or tongue 16, 16', 17 of each double helix of the tie wire is hooked over the front portion of the upper convolution of one of the springs, the tongue being directed downwardly. With all tongues thus engaged, the tie wire is rotated about a longitudinal axis to move the tongues beneath and then upwardly in front of the respective convolutions of the springs, until the tongues are directed rearwardly, and slightly upwards. At this stage each double helix will be encircling its respective spring convolution. With the tie wire held against rotation, the rear portions of the upper convolutions of springs for the adjacent row 22 are hooked on to the tongues, and the tie wire is given a further rotation, in the same direction as before, to bring the tongues beneath the said spring convolutions of both rows, which will then be encircled by the double helix formations of the tie wire, as shown more clearly in Figure 2.

It will be found that the modified helical formations co-operating with the spring convolutions will tend to resist reverse rotation from the final position encircling both convolutions. If desired, however, means may be provided for positively locking the tie wire against rotation after it has been fully engaged with the spring convolutions. For example, and as shown in Figure 3, the ends of the tie wires may be bent laterally as at 24 so that they will abut against the convolutions of the end springs of a row of springs. The row of springs 23 can be connected to the row 22 in exactly the same manner, and similarly further rows of springs can be added to build up the assembly. The lower convolutions of the several rows of springs are then interconnected with tie wires in the same manner.

As the double helix formations are connected by straight sections of the tie wire, the springs will be held correctly spaced apart along the rows.

Each row of springs may comprise any desired number of springs, and a unit having any desired number of rows of springs may be built up by means of a tie wire. The springs around the periphery of the unit may be interconnected by any convenient means, for example, by helical wires, or, as shown in Figure 3, by relatively stiff wires 25 on which are threaded helical wires 26 which latter are engaged with the springs, these means being well-known.

As previously stated, it is convenient to have the tongue portion, 16, 16' and 17 somewhat extended as shown in Figures 1 to 3 to facilitate engagement with the end convolutions of the springs. However, these tongue portions may be shorter as shown in Figure 4, the length of the tongue portions being determined according to the facility with which individual users find that they can satisfactorily engage the tongue portions with the end convolutions of the springs.

Instead of bending the ends of the tie wires as shown at 24 in Figure 3, any other convenient means may be employed for locking the tie wires against rotation after assembly in a spring unit. Another simple method for this purpose is to flatten a part of at least one of the double helix formations in each tie wire. This can conveniently be done with pliers or like tools applied at about the central part of the formation so as to deform the parts 14 and 15 into close engagement with the spring coils. If this method is employed, then the ends of the tie wires need extend only a short distance beyond the end double helix formations instead of being extended as shown in Figure 3.

I claim:

1. A tie wire for a spring assembly which comprises a plurality of coiled springs disposed in a plurality of parallel rows, the springs in one row being substantially aligned with the corresponding springs in the next adjacent row and being restrainedly hinged together by said tie wire, said tie wire having a plurality of lateral loops spaced apart along its length and formed therein before connection to said springs, each said loop comprising two legs and a central connecting portion, each said leg being formed into a helix winding around a common axis parallel with the length of said tie wire, the two helixes of each loop being oppositely directed, and the central connecting portion projecting laterally from said tie wire and forming a tongue, whereby said tongue can be engaged with the adjacent portions of a coil of each of two springs, one of each of two rows, and said tie wire can be rotated about a longitudinal axis to cause said double helix loops to encirclingly engage with said spring coils.

2. A tie wire as defined in claim 1, wherein each said double helix is deformed whereby it resiliently resists rotation about its axis relatively to said spring coils encircled by said double helix.

3. A tie wire for a spring assembly, said tie wire having a plurality of laterally offset loops spaced apart along its length, each said loop comprising a double helix, each half of said double helix, commencing from a straight portion of the tie wire, comprising a vertical upward bend followed by a rearward bend at right angles to the axis of the straight portion, then a longitudinally and downwardly inclined portion, in a plane parallel with the axis of the straight portion, down to the level of the latter, then a forward horizontal bend leading into a semi-circle about the axis of the helix which axis is parallel with the said straight portion, the semi-circle leading into a horizontal rearwardly projecting portion extending to the offset central portion of the loop which central portion connects the two halves of the double helix which are oppositely directed therefrom.

4. The tie wire as defined in claim 3, in which the said central portion of the loop comprises a semi-circle about a vertical axis, and this together with the adjacent horizontal rearwardly projecting portions of the two halves of the double helix comprises a tongue projecting substantially tangentially from the said double helix for initial engagement with the spring convolutions to be connected together.

5. A spring assembly comprising a plurality of parallel rows of upholstery coil springs, said springs being disposed with their axes parallel, and the springs of adjacent rows being substantially aligned with one another, a tie wire connecting together the upper convolutions of the springs in any two adjacent rows and a tie wire connecting together the lower convolutions of the springs in any two adjacent rows, each said tie wire having a plurality of laterally offset loops spaced apart along its length, and each said loop comprising a double helix encircling the adjacent portions of convolutions of two aligned springs without deforming the latter and permitting swinging movement of at least one of said convolutions about the axis of said double helix.

6. A spring assembly as defined in claim 5, wherein at least one end of at least one of said tie wires is bent laterally into engagement with an adjacent spring so as to prevent rotation of said tie wire about a longitudinal axis.

References Cited in the file of this patent

UNITED STATES PATENTS

| | | |
|---|---|---|
| 554,977 | Blecher | Feb. 18, 1896 |
| 1,084,948 | Mellon | Jan. 20, 1914 |
| 1,854,503 | Dietrich | Apr. 19, 1932 |
| 2,197,131 | Levine | Apr. 16, 1940 |
| 2,515,177 | Bank | July 18, 1950 |